J. O. SMITH.
Earth-Augers.
No. 154,528. Patented Aug. 25, 1874.
WITNESSES:
Jas. E. Hutchinson
John R. Young
INVENTOR.
John O. Smith, by
Prindle and Deane, his Attys

UNITED STATES PATENT OFFICE.

JOHN O. SMITH, OF CAIRO, ILLINOIS.

IMPROVEMENT IN EARTH-AUGERS.

Specification forming part of Letters Patent No. 154,528, dated August 25, 1874; application filed July 16, 1874.

*To all whom it may concern:*

Be it known that I, JOHN O. SMITH, of Cairo, in the county of Alexander and in the State of Illinois, have invented certain new and useful Improvements in Earth-Augers; and do hereby declare that the following is a full, clear, and exact description thereof, reference being had to the accompanying drawing, making a part of this specification, in which is shown a perspective view of my improved device.

The design of my invention is to enable openings for gas, water, and other pipes to be easily and quickly formed within the ground without requiring that any additional soil should be removed; to which end it consists in a boring head or point combined with an enlarged tapering follower, substantially as and for the purpose hereinafter specified.

In the annexed drawings, A represents the point or head of my device, formed, preferably, of two or more spiral wings, a and a, and increasing in diameter from its front to its rear end. At the rear end of the head A is attached a follower, B, which at its point of attachment has a considerably less size than the contiguous portion of said head, and from thence rearward increases in diameter until at its rear rounded end said follower has slightly greater transverse dimensions than have the wings a and a at the largest point.

The device, thus constructed, is attached to or upon one end of a rod or pipe, C, and used in the ordinary manner by giving to it a suitable rotation, and feeding it forward by means of a screw, or other similar mechanism.

When thus operated, the head A forms the opening, and passes the loosened soil rearward, while the follower presses such soil outward, and so firmly compacts the same as to leave the sides of the opening firm and hard, and in the proper condition to permit of the insertion of a pipe.

Having thus fully set forth the nature and merits of my invention, what I claim as new is—

The boring-head A, a, and a, and follower B, constructed and combined to operate in the manner and for the purpose substantially as specified.

In testimony that I claim the foregoing, I have hereunto set my hand this 30th day of June, 1874.

JOHN O. SMITH.

Witnesses:
W. H. MORRIS,
A. L. PITCHER.